June 13, 1933.  H. J. WOOCK  1,913,739
ADJUSTABLE RIM
Filed July 6, 1931   2 Sheets-Sheet 1

INVENTOR
H. J. Woock
BY
ATTORNEY

June 13, 1933.  H. J. WOOCK  1,913,739
ADJUSTABLE RIM
Filed July 6, 1931   2 Sheets-Sheet 2

INVENTOR
H. J. Woock
BY
ATTORNEY

Patented June 13, 1933

1,913,739

UNITED STATES PATENT OFFICE

HERBERT J. WOOCK, OF LODI, CALIFORNIA, ASSIGNOR TO SUPER MOLD CORPORATION, OF LODI, CALIFORNIA

ADJUSTABLE RIM

Application filed July 6, 1931. Serial No. 548,774.

This invention relates to rims used in connection with tire retreading molds and on which the tire to be retreaded is mounted. The present invention particularly represents improvements over the rim structure shown in the copending application for patent of myself and others, Serial No. 300,858, filed August 20, 1928. The purpose of the rim of the present application is the same as that of the previous rim, namely, to enable the tire beads of all tires of the same rim size but of different cross sectional dimensions or tread forms to be maintained in a predetermined and proper spaced relation when inflated so that the necessary firm engagement with the mold matrix will be obtained in all cases.

The principal object of the present invention is to provide a rim structure for this purpose designed to give a wide range of variation in the bead spacing, so as to meet all possible requirements of the different tires which may be encountered. I have also provided an easily adjusted means to fit and hold the bead engaging flanges of the rim in their properly spaced relation when the tire is inflated.

I have further arranged the structure so that the main body of the rim may be of pressed metal thereby enabling it to be much lighter than if a casting were used and without any loss of strength.

A further object of the invention is to produce a simple and inexpensive device and yet one which will be exceedingly effective for the purpose for which it is designed.

These objects I accomplish by means of such structure and relative arrangement of parts as will fully appear by a persual of the following specification and claims.

In the drawings similar characters of reference indicate corresponding parts in the several views:

Fig. 2 is a full sized cross section on the line 2—2 of Fig. 1.

Fig. 3 is an enlarged fragmentary side view of the rim showing the holding plate for the bead engaging flanges.

Figure 1:
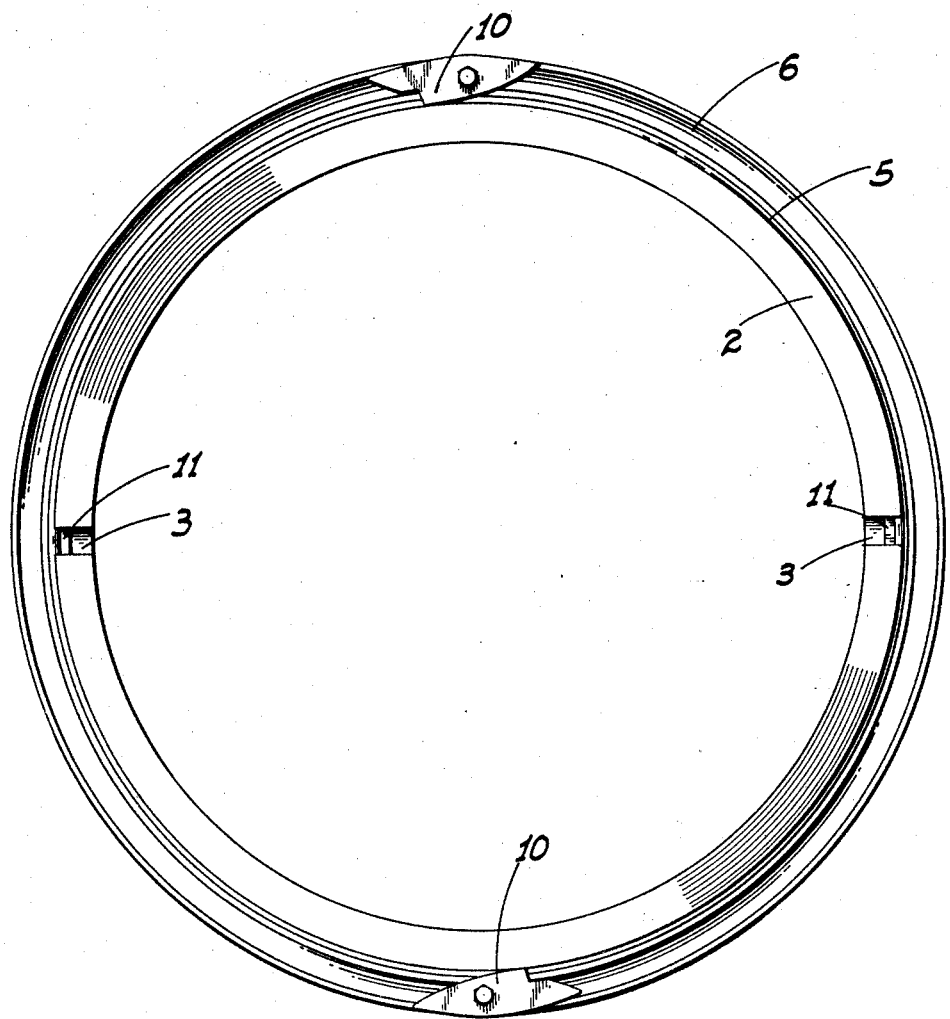
Fig. 1 is a side elevation of the complete rim structure.

Referring now more particularly to the characters of reference on the drawings, the rim is an annular endless band 1 having inwardly projecting reinforcing flanges 2 along its side edges. At diametrally opposed points the rim and the adjacent flange are slotted as at 3 from one side to a point past the center of width as shown, so as to receive the opposed intake and outlet stems of the pressure bag from said side when the bag is placed in the tire.

Formed in the outer surface of the rim toward its side are sets of circumferentially extending grooves 4. These grooves which are not necessarily spaced the same distance apart are preferably semi-circular in cross section and are adapted to removably receive split snap rings 5 of circular cross section. Slidable onto the rim from its slotted side is an endless bead engaging flange 6, a similar flange 7 being slidable on the rim from its opposite side. The adjacent faces of both flanges are of course shaped to engage and follow the contour of the outside of a tire 8 at the beads. The opposite or outer sides of both flanges at their inner periphery are formed with continuous grooves 9 adapted to overhang the portions of the rings 5 which project above the rim, so that displacement of the snap rings is then positively prevented.

Each ring 5 being mounted outwardly of its flange the latter is of course then prevented from outward lateral movement. Inward movement of the flange when thus engaged with its ring is prevented by flat retaining plates 10. These plates are made of spring metal and are pivoted intermediate their ends on the outside of the flange, preferably at diametrally opposed points. These catch plates are arranged relative to their pivots so that when the plates are turned in one direction their inner edges will project inwardly of the groove 9 and will overlap the adjacent portion of the ring 5. When the plates have turned a certain distance in the opposite direction they will clear the groove and ring so as to permit of inward movement of the flange relative to the ring, as is necessary to enable the ring to be placed in or removed from its groove in the band 1.

The flange 6 is provided with lugs 11 projecting into the slots 3 with a sliding fit, so as to prevent the slots positively closing up under pressure. This arrangement enables the rim to be made much lighter than would otherwise be possible, without danger of the rim being distorted by the relatively high pressure which acts on the same when the tire is inflated.

In operation the flange 7 and its ring 5 are first placed in the desired position on the rim after which the tire with the pressure bag therein is slid into place. The other flange 6 is then slid onto the rim, being initially moved to a point beyond the groove 4 with which the corresponding ring 5 is to be engaged. The said ring is then snapped into position after which the flange is allowed to move out until it overhangs and engages said ring. The retaining plates 10 have no action when the bag is inflated and are merely for the purpose of holding the flanges against displacement in the event that the rim is disposed horizontally and is turned on one side or the other during the mounting or removing of the tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An adjustable tire engaging rim comprising a rim-band, and independently adjustable bead engaging flanges removably mounted on the band.

2. An adjustable tire engaging rim comprising a rim-band, a rim engaging flange slidably mounted thereon, said band having a circumferential groove in its outer periphery, and a snap ring to removably engage said groove and to then project outwardly of the band; and an adjustable retaining member mounted on the outer face of the flange and adapted to be moved into or clear of overhanging relationship with the outer side of the ring when the flange is engaged with the same.

3. An adjustable tire engaging rim comprising a rim-band having a slot cut therethrough and extending transversely from one side thereof, a bead engaging flange slidably mounted on the band, and a lug on the flange having a sliding fit in said slot.

4. In a tire supporting rim for retreading molds, a rim band, a pair of tire engaging flanges removably mounted on the band in opposed relation, and means between the band and flanges separately to hold the latter in different selected positions on the band.

5. In a tire supporting rim for retreading molds, a rim band having a plurality of circumferential grooves about its outer surface, a pair of tire engaging flanges slidably mounted on the band in opposed relation to occupy predetermined positions relative to selected ones of the grooves, and snap rings removably engaging said grooves.

In testimony whereof I affix my signature.

HERBERT J. WOOCK.